US012642199B2

(12) United States Patent
Courtney

(10) Patent No.: US 12,642,199 B2
(45) Date of Patent: Jun. 2, 2026

(54) IRRIGATION SYSTEM AND METHOD

(71) Applicant: Timothy John Courtney, Longmont, CO (US)

(72) Inventor: Timothy John Courtney, Longmont, CO (US)

( * ) Notice: Subject to any disclaimer, the term of this patent is extended or adjusted under 35 U.S.C. 154(b) by 0 days.

(21) Appl. No.: 18/987,308

(22) Filed: Dec. 19, 2024

(65) Prior Publication Data

US 2025/0113786 A1      Apr. 10, 2025

Related U.S. Application Data

(63) Continuation of application No. 17/720,104, filed on Apr. 13, 2022, now Pat. No. 12,207,600.

(60) Provisional application No. 63/187,706, filed on May 12, 2021, provisional application No. 63/187,714, filed on May 12, 2021.

(51) Int. Cl.
*A01G 25/16*             (2006.01)

(52) U.S. Cl.
CPC .................................. *A01G 25/16* (2013.01)

(58) Field of Classification Search
CPC .... A01G 25/16; A01G 25/162; A01G 25/165; A01G 25/167; A01G 25/00
See application file for complete search history.

(56) References Cited

U.S. PATENT DOCUMENTS

| | | | | |
|---|---|---|---|---|
| 5,124,942 A | * | 6/1992 | Nielsen | G06F 3/0489 715/713 |
| 8,700,222 B1 | * | 4/2014 | Woytowitz | A01G 25/16 700/19 |
| 9,192,110 B2 | * | 11/2015 | Standerfer | A01G 25/16 |
| 11,096,341 B2 | * | 8/2021 | Nickerson | A01G 25/165 |

* cited by examiner

*Primary Examiner* — Ebony E Evans

(57)            ABSTRACT

A zone expander system which may be used to increase the number of zones by apportioning a parameter allotted for one zone into multiple sub-parameters for multiple new zones. The parameter may be the duration of time which the zone is active.

20 Claims, 3 Drawing Sheets

IRRIGATION SYSTEM AND METHOD

CROSS-REFERENCE TO RELATED APPLICATIONS

This application claims the benefit of U.S. application Ser. No. 17/720,104, filed on 13 Apr. 2022, now allowed, which in turn claims priority to Provisional Application Nos. 63/187,714 and 63/187,706, both filed on May 12, 2021, which are hereby incorporated by reference in their entirety.

BACKGROUND

The present invention pertains to systems and methods regulating irrigation. Irrigation systems are used to control watering of plants such as agricultural crops, landscape plants, and lawns. The systems distribute the water in a variety of ways including by spraying, flooding, soaking, or drip irrigation. Sometimes, these systems are used to spray water for cooling or dust control. These systems are sometimes used to deliver other substances such as fertilizers, foliage sprays, pesticides, herbicides, medicinal mists, or other chemicals.

In one type of irrigation system, delivery occurs within zones. Zone systems are frequently used in irrigation: the area to be irrigated is divided into zones which are selectively turned on and off by the system's controller. The system may control the time of irrigation, the length of irrigation, or even flow and other attributes.

One limitation of zone systems is that they have a preset number of zones. Therefore, if all of the zones are used, by being allocated to particular areas, the system is not capable of configuring additional areas to be controlled as zones. Accordingly, a need exists for a system and method to allow any given zone to function as multiple zones.

SUMMARY OF INVENTION

The present disclosure provides an efficient, fast, easy, and cost-effective method and system to allow any given zone to function as multiple zones, even when the system has a preset number of zones all of which are in use. The present disclosure additionally provides a solution to expand zone systems, for example sprinkler zone systems. The present disclosure additionally provides a solution to zone systems where each zone is fed by a main sprinkler valve which is controlled by a controller output signal supplied by a zone wire.

The present disclosure expands one existing zone into multiple new zones by apportioning the value of a parameters allotted to an existing zone into sub-values each allotted to one of the new zones. Specifically, where the parameter is the duration of irrigation, the present disclosure apportions the time allotted to an existing zone into sub-intervals, each allotted to a new zone.

Details of the invention and further aspects are recited in the appended claims.

DETAILED DESCRIPTION

In the following detailed description, numerous specific details are set forth by way of examples in order to provide a thorough understanding of the relevant teachings of this disclosure. It should be noted, however, that the present teachings may be practiced without such details. In other instances, methods, procedures, and components have been described at a relatively high level. In those instances, the disclosure provides sufficient detail to describe and enable it to a person of ordinary skill but avoids providing so much detail as to obscure aspects of the invention.

Figure 1:
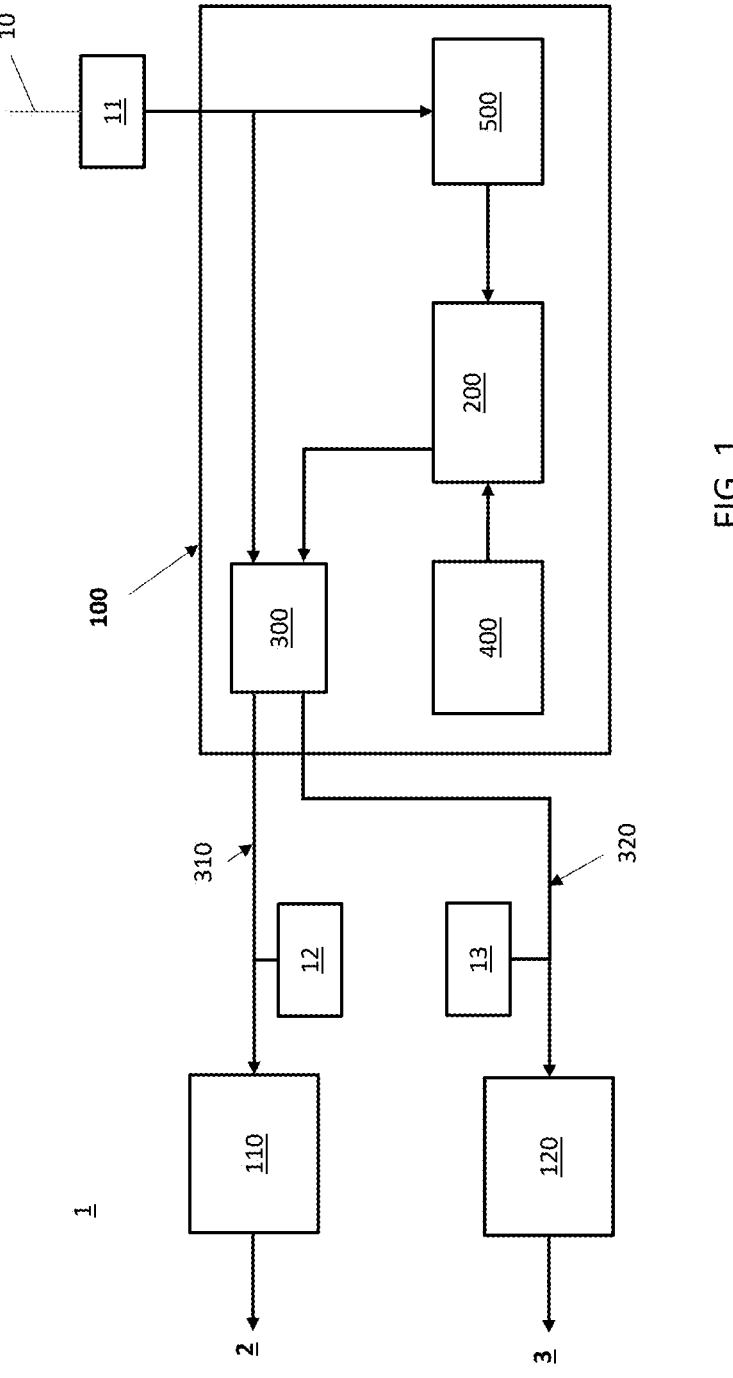
FIG. 1 is a schematic of a zone expander according to one embodiment which apportions the time allotted for an existing zone into two subzones.

Figure (FIG. 1 shows an embodiment of an irrigation system incorporating some of the present teachings where an existing zone 1 is expanded into two subzones, referred to as new zones 2 and 3. A zone system (the entirety of which is not shown) includes an existing zone wire 10 which emanates from a main system controller (not shown). Zone wire 10 is coupled to zone expander 100 and electrically communicates one or more zone parameters from the main system controller to the zone expander 100. In one embodiment of a home sprinkler system, the parameter may be a 24 V DC power signal which is enabled (ON) or disabled (OFF) for that zone for a specific period of time.

While the particular embodiment of FIG. 1 is described with reference to a zone wire, system controller, and other distinct components, the invention is not limited to the physical implementation of electronic components such as controllers, wires, switches, relays, and the like, and may instead be implemented in hardware, firmware, and software integrated into an integrated circuit, a chip, or a circuit board which incorporates some or all of the relevant functionality.

Zone wire 10 may be coupled to the zone expander 100 in any manner which establishes electrical communication. In FIG. 1, zone wire 10 is depicted as an electrical wire which is coupled using connector 11. Zone wire 10 transmits information regarding the zone parameters from the main system controller to zone expander 100. For example, a zone parameter may be the 24 V DC power is enabled for the time allotted to existing zone 1 by the main system controller.

The zone expander 100 includes controller 200, switch 300, selector switch 400, and regulator 500. The controller 200 is configured to receive the information transmitted by wire 10. Controller 200 is powered by regulator 500 which supplies the requisite power to energize the electrical components including the controller and the switches. Although, as further explained below, in one type of a 24 V DC system, the switch power will be supplied directly by the zone wire 10 and the controller 200 will control the switch setting. Controller 200 is also in electrical communication with switch 300. Switch 300 provides outputs 310 and 320 which selectively turn valves 110 and 120 on and off. Controller 200 is also in electrical communication with selector switch 400.

In operation, a user selects how to apportion the zone parameter, for example the time allotted to existing zone 1, between the new zones. In the embodiment of FIG. 1, two new zones 2 and 3 are shown, but the invention is not limited as such. For example, the user may decide to apportion a one-hour time allotted for existing zone 1 as 40 minutes for new zone 2 and twenty minutes for new zone 3. Accordingly, the user will enter this selection into selector switch 400. Selector switch 400 communicates this selection to the controller 200. The controller 200 communicates to the switch 300 to energize and activate valve 110 which services new zone 2 for 40 minutes. After 40 minutes, the controller will switch from valve 110 to valve 120 so as to activate valve 120 instead of valve 110 and irrigate new zone 3 for 20 minutes. At the conclusion of 60 minutes. Both valves 110 and 120 will be turned off by the controller 200 through switch 300. The order and manner of activation of the valves is according to the desired configuration by the user. For example, the valves may be turned on simultaneously or serially, they may be coterminous in operational time or overlapping, and the flow through the valves may be 100% or a fraction of the available water.

The components in zone expander 100 may be electrical, mechanical, electromechanical, electronic, or a combination thereof. In one embodiment, the controller and the switches are components that may be mounted on a printed circuit board and encased in a housing, enclosure, or packaging. In another embodiment, they may be integrated into a single chip. In another embodiment, they may be hard wired with components and a wire harness. The housing too may be of any configuration depending on the design, cost, and manufacturing parameters. It may be a plastic casing, a metal clam shell, a potted or overmolded enclosure, and the like.

The regulator 500 functions as a power source for the zone expander. In one embodiment, the controller and switches may run on 5V power. In such an embodiment, the regulator 500 may convert 60 Hz AC power typically found at residential outlets into 5V DC output which powers the controller and switches. In other embodiments, the regulator 500 may provide a different power output. In other embodiments, the regulator may be the power source such as a battery pack, removable or permanent, rechargeable or disposable. Where the input power to the regulator can be provided in a manner and value that is readily useable by the controller or switches, the regulator 500 may be eliminated altogether. More than one regulator may be used where necessary to provide various power outputs. Where the regulator is incorporated into the components, a separate regulator 500 may be eliminated. A few nonlimiting examples of off-the-shelf regulators include those that convert 110V AC power to different DC voltages or those that convert 24V DC to multiple DC voltages such as 1.8V DC or 2 to 5V DC. The regulator may be coupled to a battery pack which provides power to the electrical components of the zone expander. The regulator may also be replaced by a battery pack.

Where electrical wires are utilized, they may be hardwired as necessary or may be coupled using connectors. In the embodiment of FIG. 1, three connectors are shown: connector 11 couples input 10 to zone expander 100, connector 12 couples output 310 to valve 110, and connector 13 couples output 320 to valve 120. More or less connectors may be used as desired. The type of connector is selected based on design, cost, and manufacturing considerations. All couplings may be permanent, such as soldered, crimped, etc., or may be nonpermanent such as with pins and sockets. Electrical connections may be configured as wired or configured to be wireless. Wires, such as input 10 may be replaced by buses that transmit multiple signals. By way of one example, the zone parameter may be transmitted from the main system controller and an additional trigger signal may be supplied to activate the controller. The zone parameter information and the trigger signal may be combined or may be separately transmitted on a bus.

The controller can be any type of controller as mentioned above. In one implementation, the controller can be a microcontroller. The controller may be a system-on-chip or SOC, microcontroller or a microprocessor with or without digital signal processing capabilities, depending on the design. The controller may be configured with code which performs the requisite functionality, a timer, and the requisite input/output (I/O). The controller may be any programmable logic device including an FPGA or a CPLD.

The controller may consist of a state machine that is implemented in discrete logic, programmable logic, software or a combination of both. For certain selector switches, a state machine may require information that is stored and retrieved from non-volatile memory to control the state machine each time the power is applied, and the controller operates. For systems that do have a physical selector switch the state machine does not require a non-volatile memory since the controller can read the switch directly each time the power is applied, and the controller operates.

One controller may be configured to control all of the selector switches, the switch, the valves, and any sensors. In operation, the controller is configured to receive the zone parameter communicated by zone wire 10—for example the irrigation duration time for existing zone 1. The controller is also configured to receive the time apportionment information as selected by the user form selector switch 400—for example, ⅔ of the time to new zone 2 and ⅓ to new zone 3. The controller then calculates the apportioned amounts for each new zone. In the present example, the controller divides the 60-minute allotted time into ⅔, that is 40 minutes, for new zone 2, and ⅓, or 20 minutes, for new zone 3. At the beginning of the time period for existing zone 1, controller 200 sends output signal 310 to activate valve 110 and water new zone 2. At the conclusion of the 40 minutes, the controller stops output 310 and starts output 320 which in turn activates valve 120 and waters new zone 3 for 20 minutes. At the conclusion of 20 minutes. Signal 320 also stops and no new zones receive any water. The main system controller can transition to a different preexisting zone.

In the example as described, signal 310 is switched off and signal 320 is switched on afterwards based on the user's selection. If the user selected both zones 2 and 3 to be irrigated for 60 minutes, both signals would be switched on. The disadvantage of watering multiple zones is that the water pressure across the active zones typically drops. Nevertheless, if the user intends to activate multiple zones, the present system is capable of accomplishing this. Moreover, the present system is capable of apportioning the time for each new zone in a manner that is overlapping. For example, if the user selects that both zones 2 and 3 should be watered for 40 minutes, then controller may calculate the overlapping time and determine it to be 20 minutes. That is, two zones of 40 minutes each may be services within the original 60-minute allotted time, if they are overlapping for 20 minutes. Accordingly, controller 200 can switch input 310 at the beginning of the hour. After 20 minutes, controller 200 can then switch on output 320. For 20 minutes, both signals 310 and 320 are on. After which, at 40 minutes after the hour, the controller can turn off signal 310 and allow signal 320 to continue to the end of the 60-minute time slot. In this manner, both zones 2 and 3 were irrigated for 40 minutes. Obviously, the total time is not limited to 60 minutes. Note also that apportionment of the zone parameter may be implemented for any type of parameter, and the manner of apportionment may be selected by a user through a selector switch (or may be preset within the system).

The selector switch may be chosen to achieve the needs of the user. In one embodiment, the selector switch may be a simple selector with five settings: OFF, 10, 15, 30, and 45 minutes. In another embodiment, it may be a timer on which the user selects. In yet another embodiment, the selector switch may be eliminated and the ON time for a new zone may be calculated based on a fraction of the total time allotted for the existing zone, for example ½ of the time for existing zone 1 may be allotted for zone 2 in the embodiment of FIG. 1. Moreover, the allotted time for the existing zone may have been directly communicated to the zone expander or the zone expander may have measured that allotted time based on the time that existing zone 1 was active. In the embodiment of FIG. 1, controller 200 may have measured the time that existing zone 1 was ON and stored that information in a non-volatile memory for future use. In this latter-described embodiment, a timer or a real time clock source may be incorporated into the controller 200.

In yet another embodiment, the selector switch may itself be a controller, with or without a user display which allows the user to configure or program the apportionment parameters. In yet another example, the user interface may be a graphical user interface. In yet another example, the graphical user interface may be accessed through an app. In yet another embodiment the app may be downloadable on a mobile device such a phone. A person of ordinary skill would know how to construct and configure the selector switch to interface with a graphical user interface or an app so as to interact with the user and receive and transmit information therefrom.

In the example as described, the input to the controller which starts the watering process is a signal from the main system controller. Nevertheless, the controller may be triggered by other mechanisms. For example, the controller may be triggered by a signal indicating that water is being supplied to the existing zone. For example, one or more pressure sensors may be coupled to the input line or the valve chamber which receives water for the existing zone 1. The controller may be configured to be in sleep mode yet be triggered when it receives a signal from a pressure sensor indicating that the water in the input line is pressurized.

In one embodiment, the switch 300 may be a programmable relay used with a 24V solenoid valve. In another embodiment, it may be a digital control signal from the controller 200 used with a DC latching solenoid valve. The selector switch may be an actual switch that can be set to a predefined number of settings that are printed on the outside of the controller that represent the ON time for new zone 2. Alternatively, it may be a single button with an LED display, each time you press the button the controller 200 increments a counter representing the ON time for new zone 2 which is displayed on the LED display. Alternatively, the selector switch may be eliminated altogether and the ON time for new zone 2 may be programmed remotely, for example on a mobile phone app, and communicated wirelessly to the controller 200. In this latter embodiment, a non-volatile storage device may be incorporated into the system to store the information. Alternatively, the selector switch may not exist at all and the ON time for new zone 2 may be a preset amount, as explained above, for example based on ½ of the total time allotted to existing zone 1. In yet another embodiment, the switch may be a digital control signal from an embedded microcontroller. The switch may be a programmable relay component.

The valves may be any type of valve, as long as they are configured to be selectively turned on and off by the switch. The switch may be any type of switch, as long as it can operate to selectively turn the valves on and off based on the apportioned time. In one embodiment, the valves may be DC latching solenoid valves. In another embodiment, the valves may be 24V solenoid valves. In yet another embodiment, the valves may include one or more valve chambers with gates. The gates may be threaded into a respective valve chamber and may be solenoid controlled. The valve chambers may be incorporated into the zone expander housing. In another embodiment, the valves are single solenoid valves. In another embodiment the valves are incorporated into one three-way solenoid valve. In another embodiment the valves are 24V-DC-actuated valves. In one embodiment, the switch is a programmable logic controller (PLC). In other embodiments, the switch may be a field programmable gate array (FPGA) or a complex programmable logic device (CPLD).

The present system allows a zone system which has no free zones to be expanded to include additional zones. In particular, in systems where the zone valves are controlled by a zone wire from the main controller and no additional spare zone wires exist, the present system allows expanding the functionality of one zone wire so that it may services multiple new zones. Without the present teachings, an efficient and low-cost alternative would not be available in such systems because adding zone wires is often not practical. The present teachings simplify controlling multiple sprinkler zones with one sprinkler zone wire.

Figure 2:
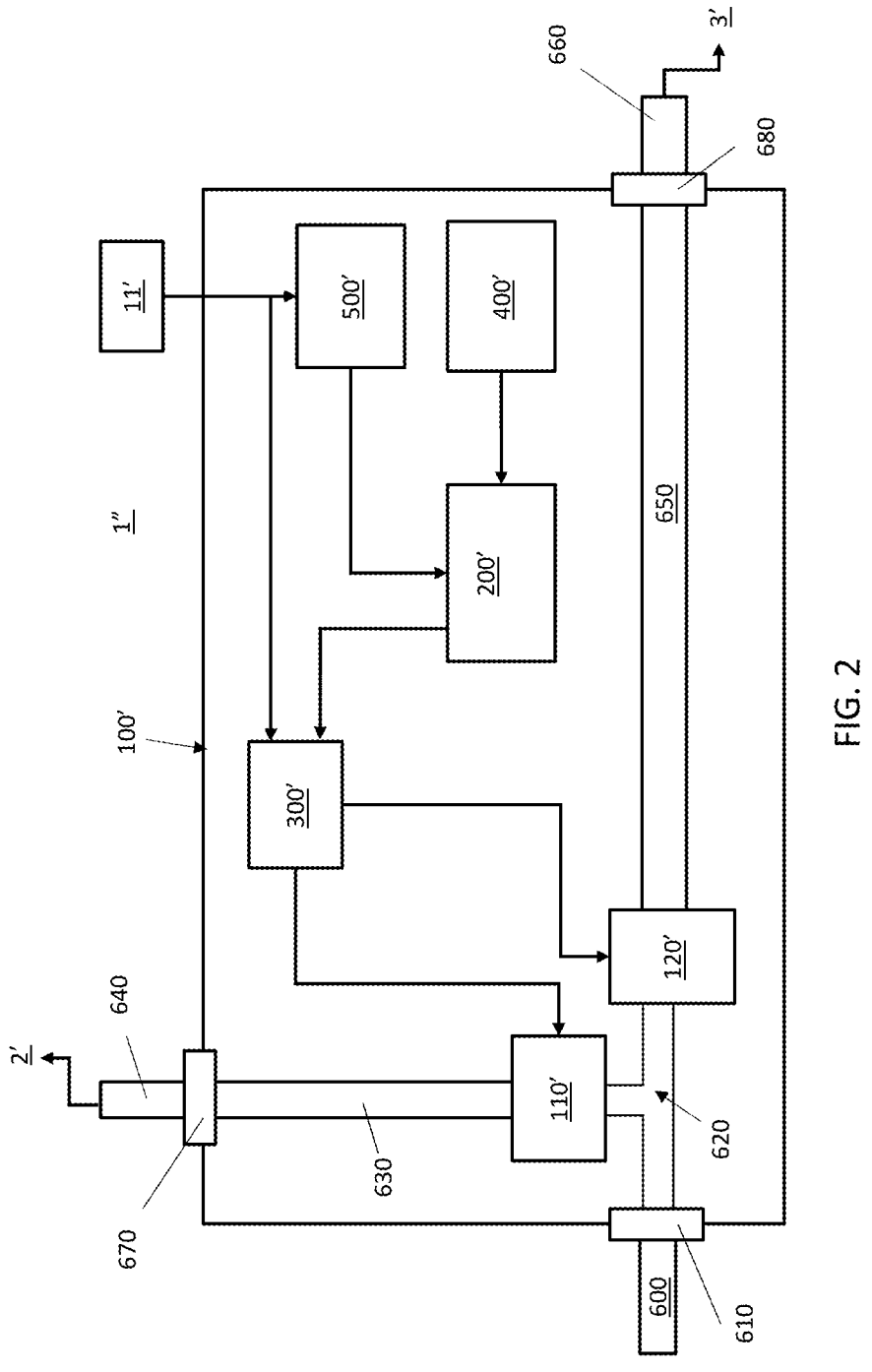
FIG. 2 depicts an embodiment of a zone expander.

FIG. 2 shows a schematic of the embodiment of FIG. 1 in conjunction with water lines. In this figure, zone expander 100' is depicted containing controller 200', switch 300', selector switch 400', regulator 500', connector 11', and valves 110' and 120', all of which function in a manner similar to that described above with respect to FIG. 1. Zone expander 100' may be coupled to input waterline 600 at connector 610. Waterline 600 includes two branches in segment 620, one of which, 630, is controlled by valve 110' and the other, 650, is controlled by valve 120'.

In operation, when the controller 200' activates valve 110' to open, water will flow from the input at 600 to segment 630 and from there to 640. Segment 640 may be routed to the new zone 2' and water flowing out of this segment can be used to irrigate that zone for the time interval which valve 110' is on. When the controller 200' signals valve 110' to shut off, valve 110' closes the waterway and water will no longer flow into segments 630 and 640. Similarly, when the controller turns on valve 120', water flows from the input at 600 through segments 650 and on to segment 660 and from there to new zone 3'. When valve 120' is shut off, the flow stops.

In the embodiment of FIG. 2, if the total allotted time for the existing zone, for example existing zone 1, is 60 minutes, and the selector switch is set for 30 minutes for each new zone (or half-and-half), the system may operate as follows: when it is time to irrigate the existing zone, for example, existing zone 1, the main system controller sends a signal to controller 200'. Controller 200' is activated and apportions the 60 minutes to two equal 30-minute time slots, one for each new zone 2' and 3'. The controller 200' may perform the functions of apportioning each time it is activated, or it may perform some or all of them at a different time. The controller actuates switch 300' which turns on valve 110' and water will flow from 600 to 640 and on to new zone 2'. Alternatively, switch 300' may be a smart switch and some or all of the functions performed by controller 200' may be incorporated into switch 300'. At the conclusion of 30 minutes, switch 300' will turn off valve 110' and turn on valve 120'. Water will then flow from 600 to 660.

In the example shown in FIG. 2, the zone expander 100' is packaged into a compact form factor. The package includes one electrical connector 11' through which all of the electrical input and output are routed. Alternatively, multiple connectors may be used and placed in different locations. The package then includes three couplings 610, 670, and 680, for attachment to three waterlines: input line 600, output line 640 for a new zone, and output line 660 for another new zone. In this example, the locations of the couplers are dispersed around the perimeter of the package. Alternatively, the input and output couplings may be placed in close proximity. Alternatively, the couplings may be combined into one or more multichannel couplings. Moreover, multiple input lines may be used, as well as multiple output lines may be configured. Further still, the input lines need not all be configured for flow of water. Other liquids in addition to or in lieu of water may be utilized. Obviously, the system is not limited to two output lines and one input line and may be configured with one or more of each.

The waterlines may be of any type including hoses, permanent irrigations lines, drip lines, etc. The connectors may be of any type as well including permanent connections or detachable couplings appropriate to create a joint based on the type of waterline used. Additionally, the input line 600 may be branched into multiple output lines 640 and 660 with one three-way valve which is controlled by the zone expander as described above with reference to FIG. 1. The switch selectively activates the three-way valve to open each of the output lines, similar to 640 and 660, according to the operation as described above with reference to FIG. 1. In such an embodiment with a three-way valve, separate valves 110 and 120 may be eliminated.

The alternative embodiment with a three-way valve may be implemented in an integrated form factor which is coupled to the input line for the existing zone (for example input line 600 for existing zone 1) and has multiple output lines for coupling to the lines for the new zones. In this manner a compact unit is provided which may simply be filled onto an existing waterline to expand it into multiple zones. Moreover, if the existing zone system is remotely controlled, it may be configured for wireless communications with the zone expander, thereby obviating the need for wired connections. This disclosure contemplates wireless and remote configurations for the zone expander. Providing wireless and remote functionalities requires hardware and software to enable transmission of data and power wirelessly. Such implementations are known in the art, and a person of ordinary skill would be able to configure the disclosed zone expander for wireless or remote communications with other sources, including with user apps on mobile devices. Alternatively, the zone expander may be wired to the existing zone system (or placed proximate to it) but wirelessly communicate with the switch which controls the three-way valve, and which may be placed remote to it.

Figure 3:
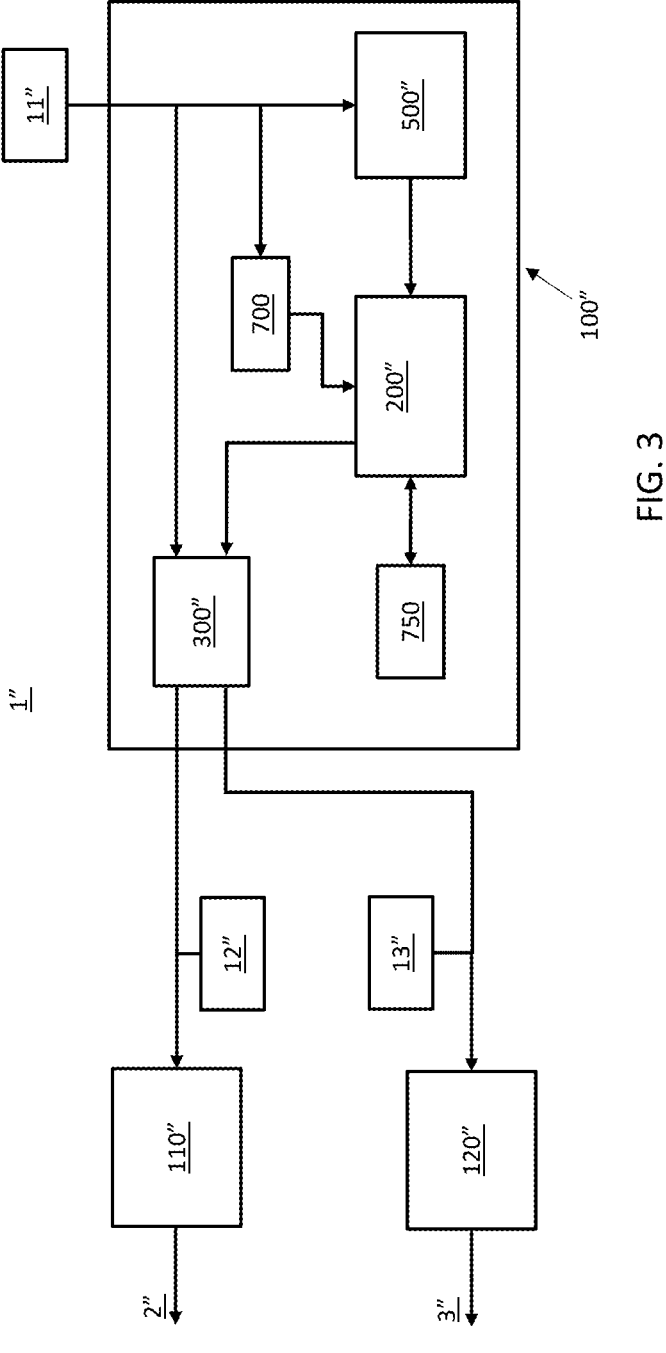
FIG. 3 depicts yet another embodiment of a zone expander.

FIG. 3 depicts an alternative embodiment. Elements similar to those in FIGS. 1 and 2 are numbered similarly as zones 1", 2", and 3"; connectors 11", 12", and 13'; valves 110" and 120"; and electronic units 200", 300", and 500". In this embodiment, zone expander 100" does not include a selector switch, such as 400 or 400', but includes a capacitor circuit 700 and a non-volatile memory 750. The capacitor circuit 700 enables controller 200" to operate for some time period after power is removed. Non-volatile memory 750 is used to store information regarding the controller, operations, or the parameter—for example, it may store the value of the apportioned time as, for example, ExpectedTotalRunning-Time. In one implementation, the initial value of the variable ExpectedTotalRunningTime may be initially set to 60 minutes, or 30 minutes, or the like. It may be so set during manufacturing or factory set. But after one operational cycle, it may be replaced by a new value. The new value is the actual time that zone 1" was ON. This actual value may be measured and stored as the variable MeasuredTotalRun-ningTime in the non-volatile memory 750. The system will operate to activate new zone 2" based on the value stored in ExpectedTotalRunningTime which may be a preset amount or the calculated fraction of the MeasuredTotalRunning-Time.

In one implementation, after the time for a first new zone, say zone 2", is measured and the ExpectedTotalRunning-Time calculated, the remaining new zone, for example new zone 3", will be assigned the remaining balance. That is, if the MeasuredTotalRunningTime was 30 minutes and zone 2" was set for ⅓ of that, 10 minutes, 20 minutes would be allotted to new zone 3". The system is capable of self-adjusting when the allotted time for existing zone 1 changes. For example, if the allotted time set by the main system for existing zone 1 becomes 50 minutes (or in general is set different than the ExpectedTotalRunningTime), then new zone 2" will run for 30 minutes and new zone 3" will run for only 20 minutes. Then, when existing zone 1 is turns OFF, the controller will notice that MeasuredTotalRunningTime has not been equal to ExpectedTotalRunningTime. Therefore, the ExpectedTotalRunningTime will be changed and set equal to MeasuredTotalRunningTime. This new value may be written to non-volatile memory 750. At the next operational cycle, new zone 2" will be selected for 25 minutes (½ of 50 minutes) and new zone 3 will be selected for 25 minutes. As long as the value of the allotted time for existing zone 1 remains at 50, MeasuredTotalRunningTime will be equal to ExpectedTotalRunningTime and therefore will not be updated in non-volatile memory 750.

The particular fractions allotted to the new zones may be preset, for example as equal amounts, or may be configured by the user using any of the mechanisms described above. For example, in the implementation of FIG. 3, each of new zones 2" and 3" may be set to ½ of the ExpectedTotalRun-ningTime. Alternatively, they may be configured to be ⅓ and ⅔ of the time. Obviously, the system is not limited to two new zones. Where multiple additional zones exist, the manner of allotting time between the zones may be configured by the user or may be preset. In one implementation, the number of active new zones may be set by the user, say N new zones. In such an implementation, the controller will calculate the allotted time for each new zone as 1/N Expect-edTotalRunningTime. While dividing irrigation time into equal apportionments for each new zone may be the most common implementation, the system is not limited so and may be configured with an algorithm that apportions the time according to a desired scheme instead of equal divisions.

The present teachings may be used in a variety of commercial, agricultural, or residential applications. The teachings may be used to manufacture zone expander devices which are sold as individual units or incorporated into existing systems. The present teachings may be combined with or incorporated into existing systems. The present teachings may also be used to expand a zone in an existing residential multizone system which has no free irrigation zones.

To implement one embodiment of the teachings herein with reference to the embodiment of FIG. 2, a homeowner may identify the existing zone wire allocated to control existing zone 1 from the main controller, for example in the sprinkler valve box typically located in the yard. The user may then disconnect this wire from the existing zone 1 valve and then may connect that same wire to a zone expander to provide power, for example as shown in FIG. 2. One way to accomplish this connection is to connect the existing zone wire allocated to control existing zone 1 to the power input on connector 11'. The user may then set the selector switch to 30 minutes or to ½. In the latter instance, with two new zones, the controller would evenly divide the time for the existing zone between two new zones 2' and 3'. For this implementation, the controller would also have to receive or measure the total time allotted to existing zone 1'. In an alternative implementation where the system is triggered by inputs other the power signal, for example where the trigger is a signal from a pressure sensor, the user may splice into the power wire in the main system controller to energize the zone extender. In this implementation, the zone extender will remain energized always but will go to sleep until the trigger signal activates it.

The user may then connect the input waterline for the existing zone, in the valve box, to the input connection at 610. The waterline servicing new zone 2' may then be routed into the valve box and coupled to valve 110'. The waterline servicing new zone 3' may be routed into the valve box and coupled to valve 120'. The main system may be manually turned on to service existing zone 1'. The user may then verify that the zone expander has become operational by observing that new zone 2' is on and new zone 3' is not.

Any of the described embodiments of the invention may be configured for multiple zones, beyond two. Moreover, multiple or all existing zones may be configured with the zone expander. For example, a four-zone system may be used as an eight-zone or a twelve-zone system using the present teachings. In one embodiment, the controller may be configured to determine the number of zones that are connected to the expander. This could be accomplished by cycling through each possible zone up to the maximum number and determining if a zone solenoid and valve is connected to the zone by monitoring if current flows when the zone is activated (the solenoid would activate and draw current). In this latter embodiment, each output zone would be equipped with its own sprinkler valve and solenoid.

The functions presently taught may be implemented in hardware, in software, or in firmware. A software implementation may be localized or distributed or may have one or more separate threads running on the different computing devices. A hardware implementation may also be distributed, and the various functions may be incorporated into various hardware units that compose the system. The present teachings may be implemented in a combination of hardware and software, as well as incorporated into firmware.

In various embodiments, the process of the present teachings may include additional application specific hardware or software ("modules"), engines, or components, or other suitable implementations that provide the described functionality. Each individual function or module may include separately configured computing devices or be combined into one. Moreover, some of the described functions may include instructions that are stored or on storage media. Programming code for carrying out operations for aspects of the present teachings may be constructed in any known format including as an application and may be written in any combination of one or more programming languages.

The code may execute separately on each party's computing device or may be accessed at a common location remotely or locally. As such, the code or executable instructions may reside in any location, local or remote. Such may be the case for the data associated with each step of the process or each of the parties, for example the client or the server. For example, if a value is saved at the client, on the client, or client side, that value is stored for use by and accessible by the client. But in reality, the physical location of this storage may be remote from the physical location of other parts of the client's device or remote from the code executing the process to save or store that data.

Many modifications and variations will be apparent to the person of ordinary skill in the art in view of the present teachings without departing from the scope and spirit of these teachings. Such modifications or variations are contemplated by the applicant and the teachings herein are intended as explanations to illuminate the present teachings and not as limiting examples. The breadth and scope of the claims are not to be limited by the particulars set forth in the specific embodiments described.

I claim:

1. A zone expander system comprising
   a. a preexisting system defining at least one preexisting zone;
   b. said preexisting zone outputting a preexisting parameter;
   c. a zone expanding controller in electrical communication with the preexisting system, wherein the controller is configured to receive the preexisting parameter, and the controller is configured to apportion the preexisting parameter into sub-parameters;
   d. at least two valves being coupled to the controller;
   wherein the controller is configured to selectively turn on each of said two valves, for respective allotted operational times, based on said apportionment;
   wherein one of the respective allotted operational times defines a first operational time and another of the respective allotted operational times defines a second operational time.

2. The zone system according to claim 1 wherein said at least two valves are two valves.

3. The zone system according to claim 2 wherein said at least two valves are integrated into a three-way valve.

4. The zone system according to claim 1 wherein the duration of the first operational time is based on said apportionment and the duration of the second operational time is based on said apportionment.

5. The zone system according to claim 1 further comprising a total time which is equal to the sum of the duration of the first operational time and the duration of the second operational time.

6. The zone system according to claim 5 wherein said controller is configured to alternate between the first operational time and the second operational time for a duration not to exceed the total time.

7. The zone system according to claim 1 wherein the duration of the first operational time is about equal to the duration of the second operational time.

8. The zone system according to claim 1 wherein the duration of the first operational time is not equal to the duration of the second operational time.

9. The zone system according to claim 1 wherein the controller is configured to alternate between the first operational time and the second operational time serially.

10. A method of adding a new zone in a preexisting system with at least one preexisting zone comprising the steps of
    a. coupling a zone expander controller to the preexisting system by electrically connecting a zone wire from said preexisting zone to an input of the zone expander controller, wherein said wire transmits a preexisting parameter from said preexisting zone to said controller, and wherein said controller is configured to apportion the preexisting parameter into at least a first sub-parameter and a second sub-parameter;
    b. coupling a fluid input channel corresponding to said at least one preexisting zone to a first valve, wherein said valve is controlled by the controller;

c. coupling a first fluid output channel to one of said first valve or a second valve, wherein said at least one of said first valve or second valve is controlled by the controller;

d. coupling a second fluid output channel to one of said first valve or a third valve, wherein said at least one of said first valve or third valve is controlled by the controller;

e. operating said controller to selectively turn on at least one of said second valve or said third valve, to turn on the first fluid output channel and define a first operational time, based in part on said preexisting parameter;

f. operating said controller to selectively turn on the other one of said second valve or said third valve, to turn on the second fluid output channel and define a second operational time, based in part on said preexisting parameter.

11. The method of adding a new zone according to claim 10 further comprising a total time, where the total time is the sum of the first operational time and the second operational time.

12. The method of adding a new zone according to claim 10 wherein a first operational time is determined by the first sub-parameter.

13. The method of adding a new zone according to claim 10 wherein a second operational time is determined by the second sub-parameter.

14. The method of adding a new zone according to claim 10 wherein the first operational time is about equal to the second operational time.

12

15. The method of adding a new zone according to claim 10 wherein the first operational time is not equal to the second operational time.

16. The method of adding a new zone according to claim 10 further comprising operating said controller to turn on the first fluid output channel and then the second fluid output channel serially.

17. The method of adding a new zone according to claim 10 further comprising alternating between the first operational time and the second operational time until the total time is reached.

18. A method of making a zone system comprising the steps of a. providing a controller in electrical communication with a preexisting zone;

b. configuring the controller to receive a power signal from said preexisting zone;

c. configuring the controller to apportion the power signal into at least two sub-parameters;

d. configuring the controller to couple to at least two valves;

wherein the controller is configured to selectively turn on each of said two valves serially;

wherein each of said two valves is turned for a total time not exceeding a time associated with the corresponding one of said sub-parameters.

19. A method of making a zone system according to claim 18 wherein said at least two valves are two valves.

20. The method of making a zone system according to claim 18 wherein said at least two valves are integrated into a three-way valve.

* * * * *